United States Patent [19]

Foster

[11] Patent Number: 5,622,095

[45] Date of Patent: Apr. 22, 1997

[54] HYDRAULIC DRIVE AND CONTROL SYSTEM

[76] Inventor: Raymond K. Foster, P.O. Box 1,, Madras, Oreg. 97741

[21] Appl. No.: 495,949

[22] Filed: Jun. 28, 1995

[51] Int. Cl.$^6$ .............................. F01L 15/00; F15B 11/08
[52] U.S. Cl. .................. 91/178; 91/461; 91/536
[58] Field of Search .............................. 91/178, 461, 536, 91/529, 170 R

[56] References Cited

U.S. PATENT DOCUMENTS

| | | | |
|---|---|---|---|
| 3,922,955 | 12/1975 | Kast | 91/461 |
| 4,561,462 | 12/1985 | Hashimoto | 91/529 X |
| 4,748,894 | 6/1988 | Foster | 91/176 |
| 4,793,469 | 12/1988 | Foster | 198/750 |
| 4,805,515 | 2/1989 | Kast | 91/461 |
| 5,103,866 | 4/1992 | Foster | 137/596.15 |
| 5,107,753 | 4/1992 | Ioku | 91/529 X |
| 5,193,661 | 3/1993 | Foster | 198/750 |
| 5,361,679 | 11/1994 | Foster | 91/448 |
| 5,375,619 | 12/1994 | Foster | 137/115 |
| 5,390,781 | 2/1995 | Foster | 198/750 |

FOREIGN PATENT DOCUMENTS 4419059  8/1969  Japan ......................................... 91/461

Primary Examiner—Hoang Nguyen
Attorney, Agent, or Firm—Joan H. Pauly

[57] ABSTRACT

A switching valve has a control rod with a pilot chamber at each of its ends. For each pilot chamber, there is a first passageway connected to a pressure line and communicating with the pilot chamber. A second passageway is connectable to return. A relief valve has a valve member biased to close an orifice to close communication between the pilot chamber and the second passageway. The valve member has an open position in which the pilot chamber is connected to return via the second passageway to allow shifting of the control rod. In a first embodiment, the pilot chamber is continuously in communication with pressure via the first passageway, and the valve member is opened by this pressure in response to connection of the second passageway to return. In another embodiment, the second passageway is continuously in communication with return, and the valve member is mechanically moved into its open position by an operator in response to pressure acting on the operator. A four-way directional control valve controls branch conduits leading from the switching valve to drive motors.

15 Claims, 11 Drawing Sheets

HYDRAULIC DRIVE AND CONTROL SYSTEM

TECHNICAL FIELD

This invention relates to hydraulic drive and control systems and, more particularly, to a switching valve in such a system having a relief valve at each of opposite ends of a control rod for selectively communicating a pilot chamber at the end of the control rod to return, and to a four-way directional control valve that opens and closes branch conduits connecting a switching valve and opposite ends of drive motors.

BACKGROUND INFORMATION

Switching valves are used in various types of hydraulically operated systems for changing connections to pressure and return during or at the end of an operational cycle. One type of system that employs switching valves is a drive and control system for a reciprocating floor conveyor. An example of a hydraulic drive and control system for a reciprocating floor conveyor is disclosed in my U.S. Pat. No. 5,193,661, issued Mar. 16, 1993 and entitled "System of Linear Hydraulic Motors". The disclosed conveyor is of a type in which each of three sets of floor slats is connected to a respective drive motor. The three drive motors are operated to move the floor slats simultaneously in a first conveying direction and then to move the slats sequentially in the opposite direction and thereafter repeat the cycle until the conveying operation is completed. The disclosed system has a switching valve for alternately supplying pressure to opposite ends of the motors to cause movable portions of the motors to move in the two directions. My U.S. Pat. No. 5,103,866, granted Apr. 14, 1992, discloses a valve which may be used as a switching valve in a drive and control system for a reciprocating floor conveyor and which has a control rod that is mechanically operated by contact with abutments carried by the motors or members connected thereto.

Drive and control systems for reciprocating floor conveyors typically have means for controlling the direction of operation of the drive motors to convey a load in either of two opposite directions. An example of a directional control valve is the one disclosed in my U.S. Pat. No. 5,361,679, granted Nov. 8, 1994. This valve is also shown in my U.S. Pat. No. 5,375,619, granted Dec. 27, 1994.

SUMMARY OF THE INVENTION

A subject of the present invention is an improvement in a switching valve of a type having a two position control rod with a pilot chamber at each of its ends. According to an aspect of the invention, the improvement comprises, for each pilot chamber, a first passageway, a second passageway, and a relief valve. The first passageway is connected to a pressure line and communicates with the respective pilot chamber. The second passageway is connectable to return. The relief valve has a valve member biased to close an orifice to close communication between the pilot chamber and the second passageway. The valve member has an open position in which the pilot chamber is connected to return via the second passageway to allow shifting of the control rod.

As used herein, the term "pressure line" means a passageway or conduit that is connected to a pressure source when the system in which the switching valve is incorporated is in operation. Thus, the first passageway is always in communication with pressure unless it or the pressure line is blocked, such as by a check valve.

In a first embodiment of the switching valve, the pilot chamber, in use, is continuously in communication with pressure via the first passageway. The valve member is moved into its open position by the pressure in response to connection of the second passageway to return. Preferably, a restriction in the first passageway allows pressure to move out from the pilot chamber through the orifice faster than pressure can move into the pilot chamber through the first passageway. In another embodiment, an operator is positioned to engage the valve member. The second passageway is, in use, continuously in communication with return. The valve member is mechanically moved into its open position by the operator in response to pressure acting on the operator.

According to another aspect of the invention, the improvement in the switching valve comprises, for each pilot chamber, a first passageway, a second passageway, a relief valve, and a conduit. The first passageway is connectable to pressure and communicates with the pilot chamber. The second passageway is connected to return. The relief valve includes a valve member biased to close an orifice to close communication between the second passageway and the pilot chamber. It also includes an operator having a first end positioned to engage the valve member and a second end with a piston formed thereon. The conduit communicates the first passageway for the pilot chamber with the piston of the relief valve for the other pilot chamber. Pressure in the first passageway for one of the pilot chambers is communicated to the pilot chamber and to the piston of the relief valve for the other pilot chamber to move the piston and mechanically unseat the valve member. This connects the other pilot chamber to return and allows pressure in said one of the pilot chambers to shift the control rod.

The last described aspect of the improvement in the switching vale may be provided in combination with a plurality of drive motors. Each motor has a movable portion that carries an abutment. First and second check valves are included, one for each of the first passageways. Each check valve has a valve member biased into a closed position in which it blocks the corresponding first passageway. The check valve also has an operator positioned to be engaged by one of the abutments to mechanically unseat the valve member of the check valve and connect the corresponding first passageway to pressure. Preferably, each check valve is, in use, continuously connected to pressure that acts on the valve member of the check valve to bias it into its closed position. Also preferably, the switching valve is operatively connected to the motors to switch pressure and return between first and second supply conduits leading to the motors to cause the movable portions of the motors to reciprocate.

According to another aspect of the invention, the switching valve has a return port as well as the two position control rod, and the improvement comprises a relief valve for each pilot chamber. The return port may be a single port or may include a plurality of ports. The relief valve has a valve cavity divided by an orifice into first and second valve chambers communicating with the corresponding pilot chamber and the return port, respectively. A valve member in the first valve chamber is biased to close the orifice. A piston is slidably received in the valve cavity spaced from the orifice to partially define the second valve chamber. An operator stem extends from a first end of the piston into the second valve chamber and the orifice to engage and unseat the valve member in response to movement of the piston toward the orifice. A conduit communicates the first valve chamber of each relief valve with a second opposite end of the piston of the other relief valve. Pressure communicated to one of the pilot chambers via the first valve chamber of the respective relief valve is also communicated to the second end of the piston of the other relief valve to unseat the valve member of the other relief valve and thereby connect the other pilot chamber to return. This allows the pressure in said one of the pilot chambers to move the control rod.

The improved switching valve is preferably provided in combination with a pressure line for each of the first valve chambers connecting the first valve chamber to pressure, and a plurality of drive motors. Each motor has a movable portion that carries an abutment. First and second check valves are provided, one for each pressure line. Each check valve has a valve member biased into a closed position in which it blocks the pressure line. An operator is positioned to be engaged by one of the abutments to mechanically unseat the valve member of the check valve and connect the corresponding first valve chamber to pressure. As described above, the check valve is preferably continuously connected to pressure which biases its valve member into the closed position.

The improved switching valve of the invention may be used in various types of hydraulic or other pressure operated systems. The operation of the valve is effective and reliable to provide effective and reliable operation of the system in which the valve is incorporated. The structure of the improvements in the valve, including the relief valves, is relatively simple, and the valve can be manufactured and maintained in a cost effective manner. A major advantage of the switching valve of the invention in comparison to mechanically operated switching valves is that, in use, the switching valve never or hardly ever needs adjustment. This helps to reduce maintenance and operational costs of the system. Embodiments of the invention including the preferred combinations described above have the additional advantage of making it possible to minimize the number of components of the overall system without sacrificing the reliability and effectiveness of the system.

Another subject of the invention is a four-way valve in combination with additional elements in a control system for a reciprocating floor conveyor of a type having a plurality of floor slats and a plurality of fluid pressure operated drive motors for reciprocating the floor slats. The combination comprises first and second conduits, a switching valve, and the four-way valve. Each of the conduits has a main portion leading to the motors, and a branch portion. The switching valve alternately connects the conduits to pressure and return to reciprocate the floor slats. The four-way valve has first and second ports communicating with the branch portions of the first and second conduits, respectively. It also has third and fourth ports communicating with opposite ends of the motors. The four-way valve has a first position in which it connects the first port with the third port and blocks communication between the second and fourth ports to cause the conveyor to convey a load in a first direction. In a second position, it blocks communication between the first and third ports and connects the second and fourth ports to cause the conveyor to convey a load in a second opposite direction.

The four-way valve of the combination described above has the advantages of being simple in construction and of helping to reduce the number of connections in the control system. It may advantageously be provided in further combination with the type of switching valve described above.

These and other advantages and features will become apparent from the detailed description of the best modes for carrying out the invention that follows.

BRIEF DESCRIPTION OF THE DRAWINGS

Like reference numerals are used to designate like parts throughout the several views of the drawing, and.

BEST MODE FOR CARRYING OUT THE INVENTION

The drawings show switching valves 10, 10' and associated relief valves V1, V2, V1', V2' and a hydraulic drive and control system that are constructed according to the invention and that constitute the best modes for carrying out the invention currently known to the applicant. The system of the invention is intended primarily for use in powering the conveyor slats of a reciprocating slat conveyor. The system illustrated herein is designed for use in a reciprocating slat conveyor having three groups of slats with each group being powered by a separate hydraulic motor. My U.S. Pat. No. 4,793,469 describes the operation of such a conveyor. Particular reference is made to FIGS. 2–6 of that patent, which illustrate the movements of the slats during operation of the conveyor.

Figure 1:
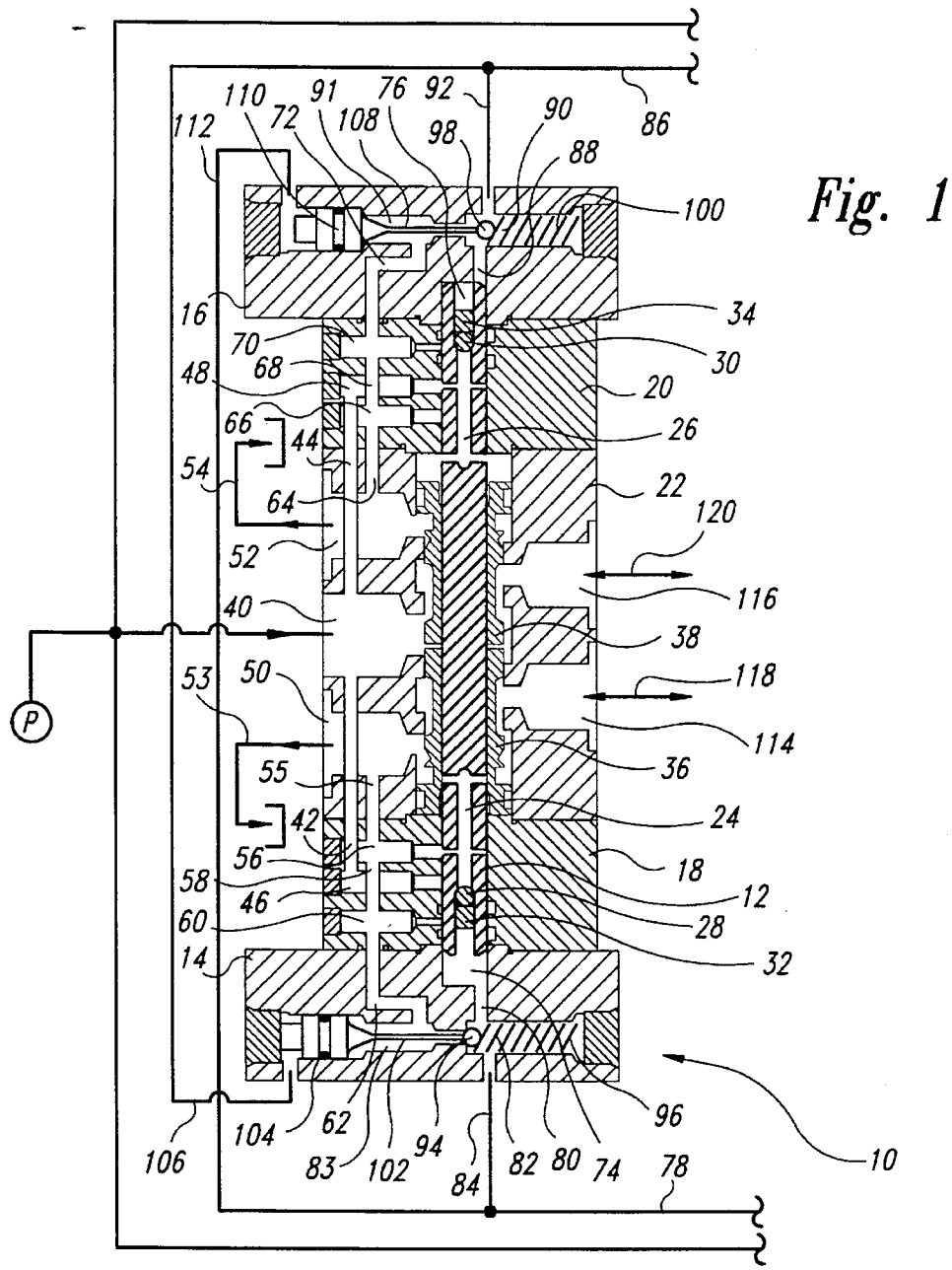
FIG. 1 is a longitudinal sectional view of a pressure/return switching valve that is a part of a first embodiment of the present invention.

Referring to FIG. 1 of the present application, the first illustrated embodiment of the invention includes a switching valve 10. The valve 10 is basically like the valve that is disclosed in my U.S. Pat. No. 5,103,866 (FIGS. 7–16) except that the control rod 12 is shifted endwise hydraulically instead of mechanically. One difference is that the valve 10 of the invention has a five-part housing whereas the valve disclosed by U.S. Pat. No. 5,103,866 has a three-part housing. The housing parts of valve 10 are bolted together in the manner disclosed by U.S. Pat. No. 5,103,866 (e.g. FIG. 11). Added to valve 10 of the present invention, are housing end parts 14, 16. End part 14 is endwise outwardly of intermediate part 18. End part 16 is endwise outwardly of intermediate part 20. Center part 22 is sandwiched between intermediate parts 18, 20. O-ring seals are used between the parts to prevent leaking. The construction and arrangement of the O-ring seals is shown in U.S. Pat. No. 5,103,866 and thus is not herein repeated. A drill bit or other tool is used to form passageways 24, 26 in the end portions of control rod 12. A larger diameter bore is formed outwardly of each passageway 24, 26. Closure balls 28, 30 are positioned in these bores and plugs 32, 34 are positioned outwardly of the closure balls 28, 30. The bores are internally threaded and the plugs 32, 34 are externally threaded. The plugs 32, 34 are externally threaded. The plugs 32, 34 are screwed in tightly against the closure balls 28, 30 to form fluid tight end closures for the passageways 24, 26.

Popper members 36, 38 are positioned on and are supported by the control rod 12, in the same manner as disclosed in U.S. Pat. No. 5,103,866. The inner confronting ends of poppets 36, 38 are separated by a small gap and are always exposed to pressure in an inlet port 40 of valve 10. The opposite end of each poppet 36, 38 has a piston formed thereon. The details of the poppet members 36, 38 will not be further described herein as such details are very well described in U.S. Pat. No. 5,103,866.

A pump P delivers hydraulic fluid pressure to inlet port 40. Branch conduits 42, 44 deliver the fluid pressure through distribution ports 46, 48. Return ports 50, 52 are connected to conduits 53, 54 which return to tank, as shown schematically in FIG. 1. Return port 50 is connected by passageway 55 to port 56, passageway 58, port 60, and passageway 62. Return port 52 is connected by passageway 64 to port 66, passageway 68, port 70, and passageway 72. Port 60 and port 70 each open onto the longitudinal cavity in which the control rod 12 reciprocates between two annular grooves, to provide an escape for any fluid that might seep past seals (not shown) positioned in the grooves. The pairs of seals help maintain smooth operation of the control rod 12. Pilot chambers 74, 76 are formed endwise outwardly of the two ends of control rod 12. Pilot chamber 74 is connected to a conduit 78 by a passageway 80, a valve chamber 82 of a relief valve V1, and a passageway 84. Pilot chamber 76 is connected to a conduit 86 by a passageway 88, a valve chamber 90 of a relief valve V2, and a passageway 92.

The relief valve V1 has a valve cavity divided by an orifice into first and second valve chambers 82, 83. Valve chamber 82 contains a closure ball 94 and a spring 96 which biases closure ball 94 into a position in which it closes the orifice. Valve ball 94 is confronted by a stem portion 102 of an operator which mechanically unseats the valve ball 94. As shown in FIG. 1, the end of the stem 102 extends through the orifice. The outer diameter of stem 102 is smaller than the diameter of the orifice. Thus, when the ball 94 is unseated, fluid pressure can move through an annular passageway formed around the stem 102. The end of stem 102 opposite the ball 94 is attached to a piston 104. The stem end of piston 104 communicates with return passageway 62 via valve chamber 83 and defines one end of valve chamber 83. The opposite end of piston 104 is connected to a passageway 106. Passageway 106 extends to and is connected to passageways 86, 92.

In relief valve V2, the valve cavity is divided by an orifice into first and second valve chambers 90, 91. A closure ball 98 in chamber 90 is biased by spring 100 to close the orifice. Closure ball 98 is confronted by a stem 108 that is connected to a piston 110. The stem end of piston 110 is connected to return passageway 72 via valve chamber 91. The opposite end of piston 110 is connected to passageway 112 which leads over to and is connected to passageways 78, 84. Since the stem end of each piston 104, 110 is always connected to return, connecting the opposite end of the piston 104, 110 to pressure will cause the piston 104, 110 to move to unseat the ball 94, 98.

Switching valve 10 includes two distribution ports 114, 116, which connect to distribution conduits 118, 120. In one position of the switching valve 10, conduit 118 is connected to return or tank and conduit 120 is connected to pressure. In the second position of the switching valve 10, the conduit 118 is connected to pressure and the conduit 120 is connected to return.

Herein, the terms "conduit", "passageway", "port" and "line" are used to mean any one of a number of structures which contain, conduct or transfer a hydraulic fluid. They can take the form of pipes, hoses, drilled passageways, etc.

Referring to FIGS. 3–10, valve V3 is a two-positional, four-way valve. Its function is to control the direction in which the system conveys a load. This is accomplished by selectively opening and closing communication between the distribution conduits 118 and 120 and portions of valves V4–V9 and motors M1–M3, as described below.

Figure 2:
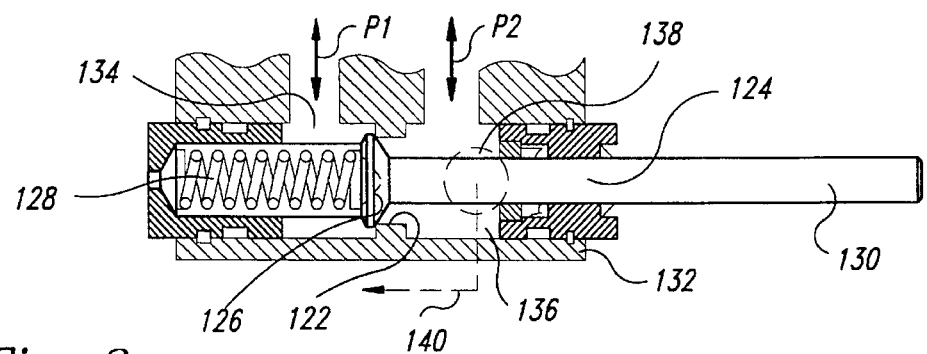
FIG. 2 is a fragmentary view, partially in longitudinal section and partially in elevation, of a check valve that is a part of the invention, such valve being biased closed by a spring and being openable by a pressure differential force acting on the valve plug in opposition to the spring and by a mechanical force applied to the valve plug in opposition to the spring.

Valves V4, V5, V6, V7, V8, V9 are duplex valves. As will be described, each is in the nature of a check valve that is normally closed by a bias spring. Fluid pressure through the valve in opposition to the spring force will open the valve, except as described below in relation to valves V4, V9. Fluid pressure in the opposite direction will act with the spring to hold the valve closed. However, each valve includes a mechanical operator which can open the valve in opposition to the spring and fluid pressure forces. The valve shown by FIG. 2 is representative of all the valves V4, V5, V6, V7, V8, V9. Valves V4 and V9 further include a bypass passageway that is always open and is isolated from the valve plug. This passageway is not shown in FIG. 2.

Referring to FIG. 2, the valve has an orifice 122. A valve member 124 includes a valve plug 126 that is normally biased into a closed or seated position with respect to the orifice 122 by a spring 128. Valve member 124 also includes an operator 130 which projects out from the valve housing 132. Passageway P1 leads into and out from the spring chamber 134. There is a valve chamber 136 on the opposite side of the orifice 122. A passageway P2 is connected to chamber 136. Chamber 136 is also connected via a port 138 to a passageway 140.

When passageway P2 is connected to pressure and passageway P1 is connected to return, a pressure differential acting on the valve plug 126 will move the valve plug 126 away from its seated position, against the force of spring 128. This will open the orifice 122 and will allow fluid pressure movement from passageway P2, into chamber 136, then through orifice 122, into chamber 134 and into passageway P1. When passageway P1 is connected to pressure and passageway P2 is connected to return, the valve plug 126 is normally biased into its seated position by the combined forces of the spring 128 and the fluid pressure within chamber 134. However, a mechanical force applied endwise on actuator 130, in opposition to the spring and fluid pressure forces, will unseat the valve plug 126 and allow fluid pressure movement from passageway P1 and chamber 134 through orifice 122 into chamber 136 and passageways P2 and 140. As will be apparent, fluid pressure communicated with chamber 136 by passageway 140 will also unseat the valve plug 126.

The system shown in FIGS. 3–10 includes three linear hydraulic motors M1, M2, M3. Motors M1, M2, M3 are essentially like the motors disclosed in my U.S. Pat. No. 4,748,894. The cylinder portion of each motor M1, M2, M3 carries two axially spaced abutments A that are positioned to engage the operators of valves V4–V9 to mechanically open valves V4–V9. The system also includes members DB1, DB2, DB3, which are transverse drive beams connected to the motors M1, M2, M3, respectively, in the manner shown in U.S. Pat. No. 4,793,469. Each transverse drive beam DB1, DB2, DB3 carries a plurality of connectors which are used to connect the drive beams DB1, DB2, DB3 to the conveyor slats. These connectors are shown in U.S. Pat. No. 4,793,469 and are designated 82, 84, 86 in that patent. The construction of the drive beams DB1, DB2, and DB3 and the connectors are essentially the same as what is disclosed in U.S. Pat. No. 4,793,469. The disclosure therein of these components is incorporated herein by reference.

Figure 3:
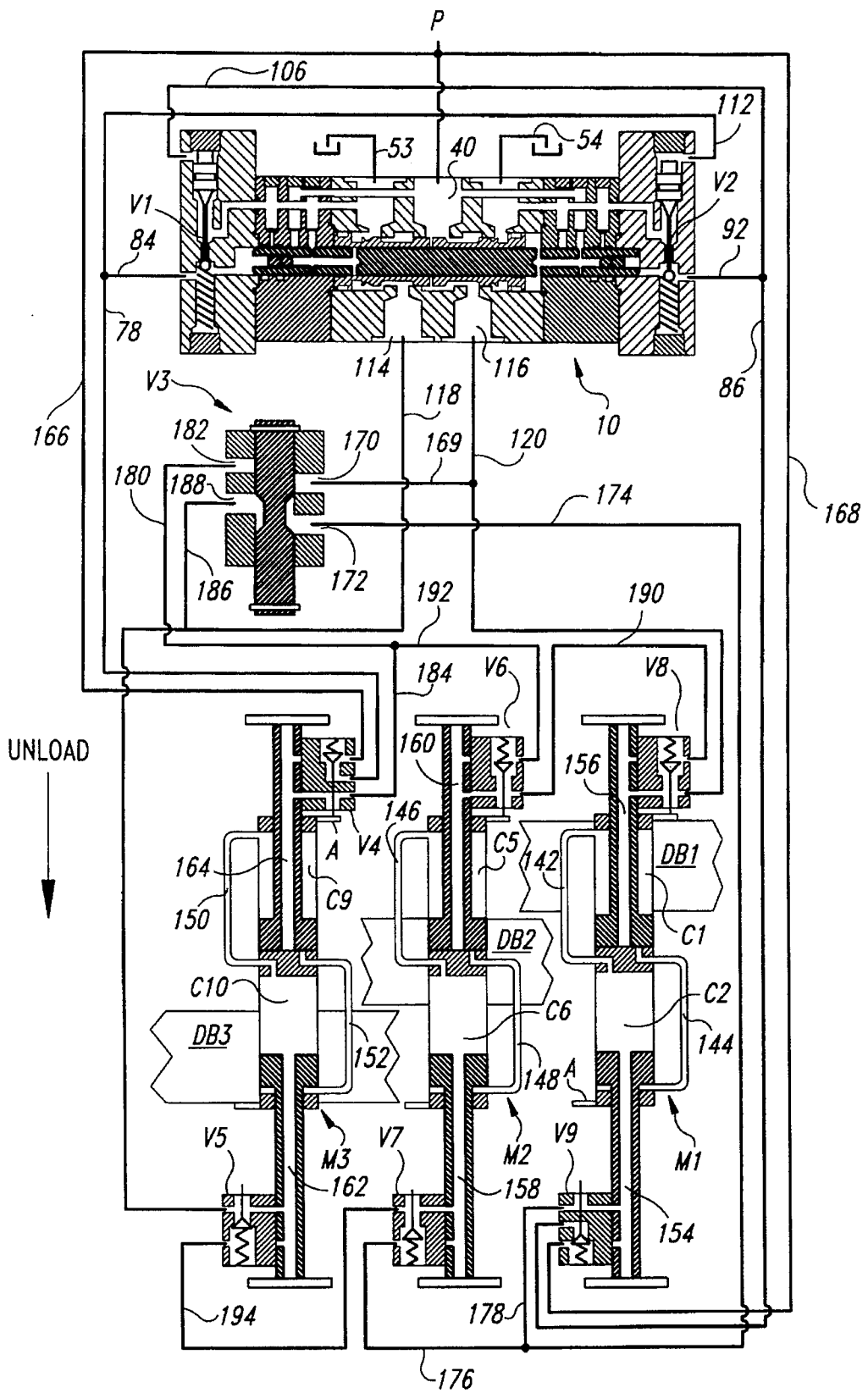
FIG. 3 is a schematic diagram of three linear hydraulic motors and a control system for automatically controlling hydraulic fluid pressure to and from the working chambers of the motors, such view showing the various valves positioned to cause a simultaneously movement of the three motors in the direction of the arrow labeled "unload".
Figure 4:
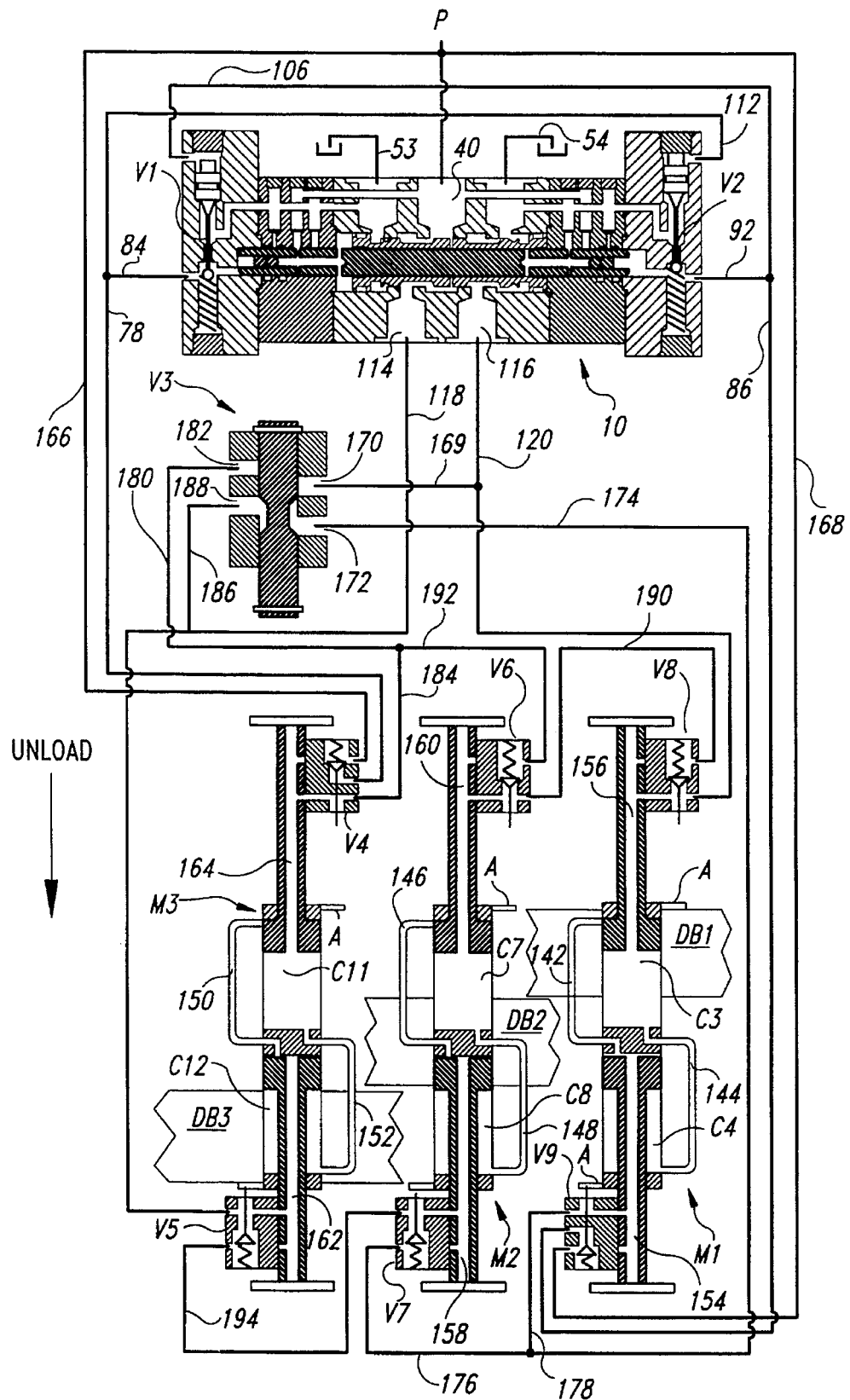
FIG. 4 is a view like FIG. 3, but showing the three motors at an end of stroke position, and showing various valves positioned to start a return sequence of the motors.

Referring to FIGS. 3–10, each motor M1, M2, M3 has four working chambers. These chambers are designated C1, C2 (FIG. 3), C3, C4 (FIG. 4), C5, C6 (FIG. 3), C7, C8 (FIG. 4), C9, C10 (FIG. 3) and C11, C12 (FIG. 4). Working chambers C1, C2 are connected by a conduit 142 (FIG. 3). Working chambers C3, C4 are connected by a conduit 144 (FIG. 4). Working chambers C5, C6 are connected by a conduit 146 (FIG. 3). Working chambers C7, C8 are connected by a conduit 148 (FIG. 4). Working chambers C9, C10 are connected by a conduit 150 (FIG. 3). Working chambers C11, C12 are connected by a conduit 152 (FIG. 4).

As shown in FIGS. 3–10, the piston rods include fluid pressure passageways which deliver fluid pressure into and out from the working chambers C2, C3, C6, C7 and C10, C11. The piston rod passageway leading between valve V9 and working chamber C2 is designated 154. The passageway leading between valve V8 and working chamber C3 is designated 156. The passageway leading between valve V7 and working chamber C6 is designated 158. The passageway leading between valve V6 and working chamber C7 is designated 160. The passageway leading between valve V5 and working chamber C10 is designated 162. The passageway leading between valve V4 and working chamber C11 is designated 164.

FIGS. 3–10 illustrate a system that includes the passageways shown in FIG. 1 and a number of additional passageways and associated valve ports. Pressure passageways 166, 168 lead to valves V4, V9 as described further below. A branch conduit 169 connects conduit 120 to port 170 of valve V3. Port 170 of valve V3 is connected by conduits 174, 176 to the spring chamber of valve V7 and by conduits 174, 178 to passageway 154 in motor M1. Conduits 180, 192 connect port 182 of valve V3 with the spring chamber of valve V6. Conduit 180 and a conduit 184 connect port 182 of valve V3 with passageway 164 in motor M3. A branch conduit 186 connects port 188 in valve V3 with conduit 118. Conduit 190 connects the spring chamber of valve V8 with the valve chamber of valve V6 and passageway 160 in motor M2. Conduit 194 connects the spring chamber of valve V5 with the valve chamber of valve V7 and passageway 158 in motor M2.

Pressure passageway 166 leads directly from the pressure source to the spring chamber of valve V4, and pressure passageway 168 leads directly from the pressure source to the spring chamber of valve V9. Because of these connections, valves V4, V9 can only be opened mechanically. The pressure continuously supplied to the spring chambers through passageways 166, 168 acts on the valve plugs to prevent them from being unseated by pressure in the valve chambers.

The operation of the system is illustrated in FIGS. 3–10. FIGS. 3–6 illustrate the operation of the system to convey a load in the unload direction indicated by the arrow in FIGS. 3–6. FIGS. 7–10 illustrate the operation to convey a load in the load direction indicated by the arrow in FIGS. 7–10. As noted above, the function of the valve V3 is to control the direction in which the system conveys a load. Valve V3 has a first unload position illustrated in FIGS. 3–6 and a second load position illustrated in FIGS. 7–10. Referring to FIGS. 3–6, the valve V3 is positioned to block communication between ports 170 and 182 and thereby to block communication between branch conduit 169 of conduit 120 and passageway 164 in motor M3 via conduits 180, 184 and with the spring chamber of valve V6 via conduits 180, 192. Communication between ports 188 and 172 of valve V3 is open to allow communication between conduit 118, 186 and the spring chamber of valve V7 via conduits 174, 176 and with passageway 154 in motor M1 via conduits 174, 178. In the load position of the directional valve V3 shown in FIGS. 7–10, communication between ports 170, 182 is opened and communication between ports 188, 172 is closed.

Referring to FIG. 3, at the start of the unload cycle, abutments A on motors M1, M2, M3 are in contact with the operators of valves V8, V6, V4 and are holding valves V8, V6, V4 in an open position. Switching valve 10 connects conduit 120 to pressure. Conduit 118 is connected to tank or return. Pressure in conduit 120 is delivered into working chamber C3 of motor M1 via valve V8 and passageway 156 and into working chamber C4 from chamber C3 via passageway 144. Within valve V8, the pressure acts on the valve plug and moves past the valve plug through valve V8 into conduit 190. From conduit 190 it flows into working chambers C7 and C8 of motor M2 via valve V6 and passageways 160 and 148. While in valve V6, the pressure acts on and moves past the valve plug, communicating the pressure with passageways 192, 184. This communicates the pressure with working chambers C11, C12 in motor M3 via the bypass passageway in valve V4 and motor passageways 164, 152. Thus, the working chambers C3, C4, C7, C8, C11, C12, are all connected to pressure. At the same time, working chambers C1, C2, C5, C6, C9, C10 are all connected to return. As a result, the cylinders of the three motors M1, M2, M3 move simultaneously in the unload direction.

The motors M1, M2, M3 simultaneously move the drive beams DB1, DB2, DB3, and the floor slat members connected to them, from the position shown in FIG. 3 to the position shown in FIG. 4. When the motor cylinders begin to move, the abutments A move out of contact with the operators of valves V4, V6, V8. Pressure in the valve chambers of valves V6, V8 continues to hold valves V6, V8 open so that pressure continues to be supplied to working chambers C7, C8 of motor M2 and working chambers C11, C12 of motor M3 via passageways 190 and 192, 184, respectively. The floor slats move in unison in the direction indicated by the "unload" arrow. If the conveyor is within a trailer, the conveyor slats are moved in unison from the front of the trailer to the back of the trailer, for unloading a load within the trailer. In order to facilitate the description of the operation of the system, hereinafter the motor positions shown in FIGS. 3 and 4 will be referred to as the forward and rearward positions, respectively.

With respect to the return connections shown in FIG. 3, working chamber C1 of motor M1 is connected to working chamber C2 via conduit 142. The working chambers C1, C2 are connected to conduit 178 by passageway 154 and the bypass passageway in valve V9. Conduit 178 is connected to conduit 174 which is connected to return via valve V3 and passageways 186, 118. Working chamber C5 of motor M2 is connected with working chamber C6 by passageway 146. The working chambers C5, C6 are connected with the valve chamber of valve V7 by passageway 158. The spring chamber of valve V7 is connected to return by passageways 176, 174. As motor M2 begins to move, return pressure in working chambers C5, C6 and passageway 158 causes the valve V7 to crack open an amount sufficient to allow fluid to escape from working chambers C5, C6 through passageway 158 and the open valve V7 to return via conduits 176, 174. Working chamber C9 of motor M3 is connected to working chamber C10 via conduit 150. The working chambers C5, C6 are connected to return via motor conduit 162, the valve chamber of valve V5, and conduit 118. When the movement begins and until near the end of the stroke, valve V5 is and remains closed by its spring bias and by return pressure in conduit 194 which communicates the spring chamber of valve V5 with the valve chamber of valve V7. Valve V9 is similarly closed by its spring bias and by communication of its spring chamber with pressure via conduit 168.

Referring to FIG. 4, as the motors M1, M2, M3 approach their rearward positions shown in FIG. 4, the rear abutments A on the motors M1, M2, M3 contact the operators of valves V9, V7, V5, respectively. This moves valves V5, V9 from their closed positions shown in FIG. 3 to their open positions shown in FIG. 4. It also fully opens valve V7. The opening of valve V9 communicates the right hand end (as shown) of control rod 12 of switching valve 10 to pressure via chamber 90 of valve V2, conduits 92, 86, valve V9, and conduit 168, which is always connected to pressure. Pressure from conduit 86 is also communicated to the piston 104 of valve V1 via conduit 106. This causes the piston 104 to move so that the operator stem 102 extending therefrom unseats ball 94. The left end of control rod 12 is connected to return via chamber 82 of valve V1, the open orifice of valve V1, conduits 62, 58, 55, port 50, and conduit 53. The piston 110 of valve V2 is connected to return via conduits 112, 84, chamber 82 of valve V1, etc. This allows spring 100 to seat the ball 98.

The pressure on the right hand end of control rod 12 shifts the rod 12 to the left from the position shown in FIG. 3 to the position shown in FIG. 4. The shifting of the rod 12 moves passageway 24 in the rod 12 out of communication with return port 56 and into communication with pressure distribution port 46. At the opposite end of the rod 12, passageway 26 is moved out of communication with pressure distribution port 48 and into communication with return port 66. This allows the pressure in inlet port 40 to move poppet 38 to the right (as shown). Poppet 36 also moves to the right since the piston at the left end of the poppet 36 is exposed to pressure via port 46 and has a larger pressure surface area than the opposite end of poppet 36 that is exposed to pressure in inlet port 40. The shifting of the poppers 36, 38 causes conduit 118 to be switched from return to pressure via port 40, and conduit 120 to be switched from pressure to return via port 52. The connection of conduit 120 to return allows the biasing springs of valves V6, V8 to close valves V6, V8.

The switching of conduits 118, 120 to pressure and return, respectively, causes the motors M1, M2, M3 to move sequentially in the forward direction. Motor M1 is the first to move. Pressure is communicated to working chamber C2 of motor M1 via motor passageway 154, the bypass passageway through valve V9, conduits 178, 174, valve V3, and conduits 186, 118. Pressure from working chamber C2 is communicated to working chamber C1 through passageway 142. The pressure in the working chambers C1, C2 moves the motor forwardly from the rearward position shown in FIG. 4 to the forward position shown in FIG. 5. Movement of the motor is permitted by connection of working chambers C3, C4 to return. Chamber C4 is connected to chamber C3 by conduit 144. Chamber C3 is connected to return via motor passageway 156, valve V8 and conduit 120.

Movement of motor M1 out of its rearward position shown in FIG. 4 allows the spring bias of valve V9 to close valve V9. As motor M1 moves toward its forward position shown in FIG. 5 and until motor M1 is near the end of the stroke, valves V6, V8 at the forward ends of motors M2, M1 remain closed under the force of their spring bias. Valve V4 at the forward end of motor M3 remains closed under the force of its spring bias and the connection of its spring chamber to conduit 166, which is always connected to pressure. The valve chamber of valve V4 is connected to return via conduits 78, 84 and chamber 82 of valve V1. Forward movement of motor M2 is blocked by the blocking of working chambers C7, C8 from communication with return by the closed valve V8.

Figure 5:
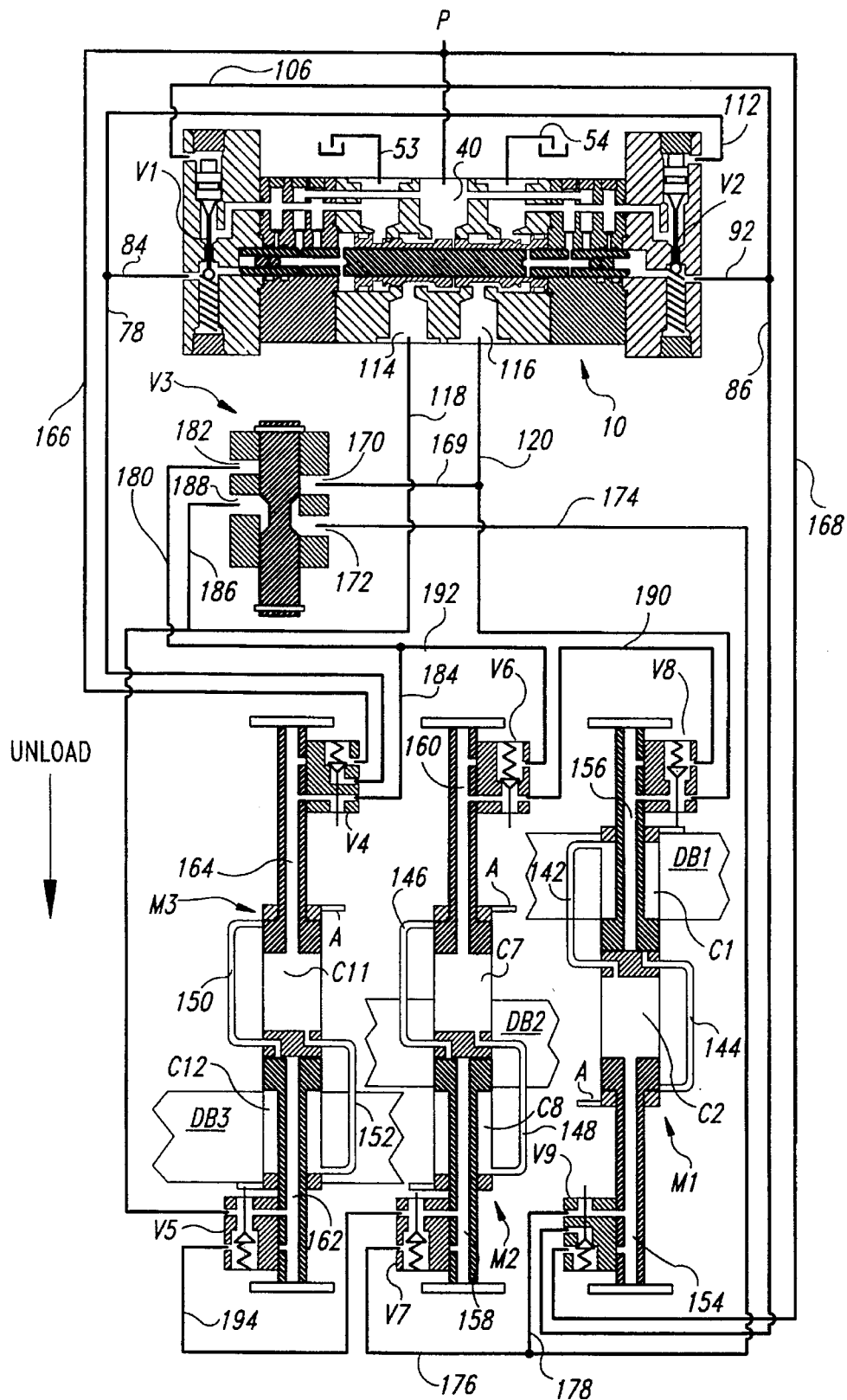
FIG. 5 is a view like FIGS. 3 and 4, but showing a first of the motors returned to its start position and a valve opening which triggers the next step of the sequence.

Referring to FIG. 5, as motor M1 approaches its forward end of stroke position shown in FIG. 5, the forward abutment A on motor M1 engages the operator of valve V8 to open valve V8. This communicates working chamber C7 of motor M2 with return via passageway 160, the valve chamber of valve V6, passageway 190, open valve V8, and conduit 120. Working chamber C8 is also connected to return via conduit 146 and working chamber C7. The opening of communication of working chambers C7 and C8 with return allows motor M2 to be moved forwardly by the action of pressure in working chambers C5, C6 of motor M2. The pressure is supplied via conduit 118, open valve V5, conduit 194, the valve chamber of valve V7, and passageway 158. As motor M2 moves toward its forward position shown in FIG. 6, forward movement of motor M3 is blocked by the blocking of working chambers C11, C12 from connection to return by closed valve V6. Valve V6 remains closed until motor M2 approaches its end of stroke forward position shown in FIG. 6 when the forward abutment A on motor M2 contacts the operator of valve V6. Valve V7 closes as soon as the rear abutment on motor M2 moves out of contact with its operator due to its spring biasing.

Figure 6:
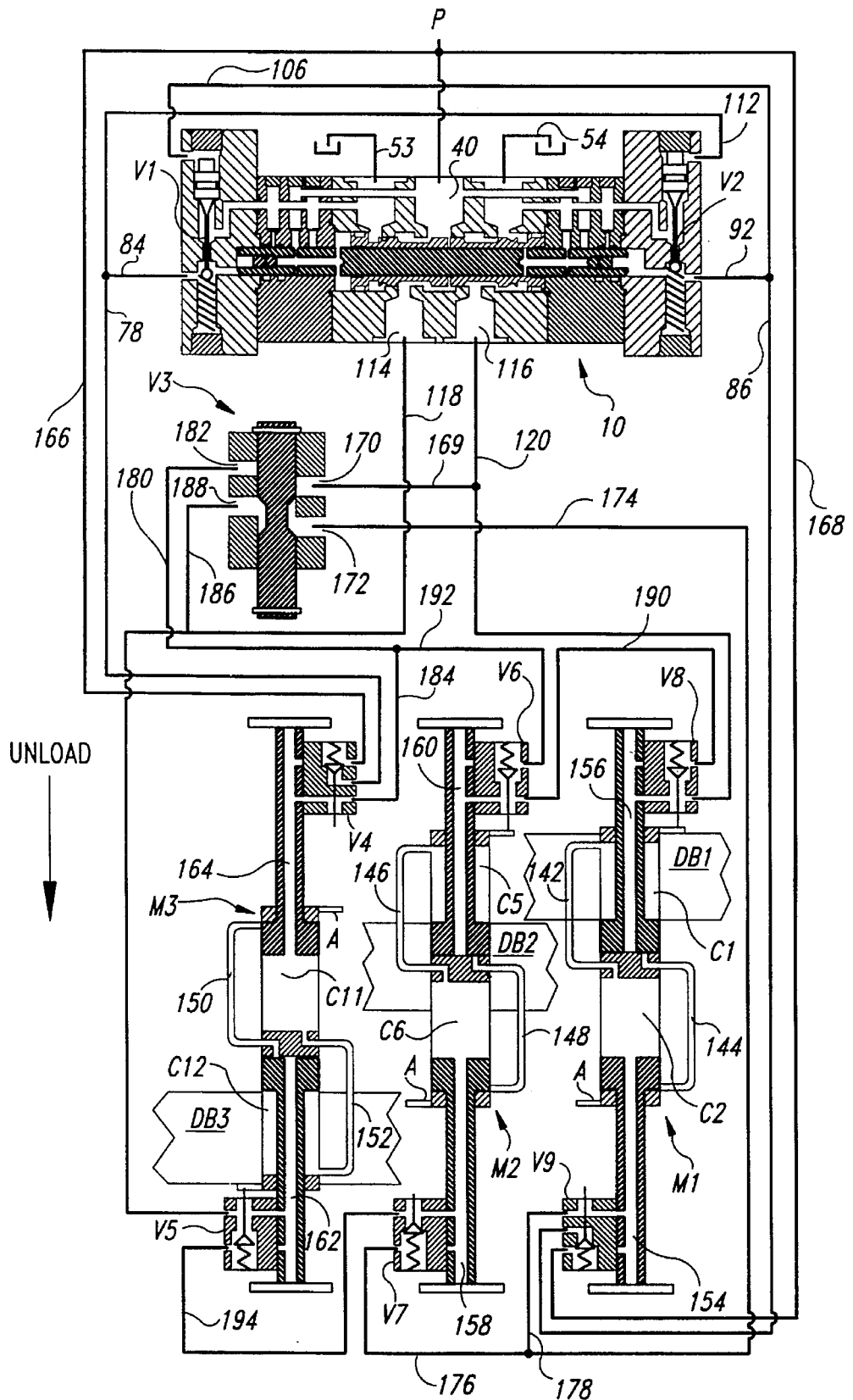
FIG. 6 is a view like FIGS. 3–5, but showing a second of the motors returned to its start position and the opening of a valve which triggers the next step of the sequence.

Referring to FIG. 6, the opening of valve V6 near the end of the stroke of motor M2 connects working chambers C11, C12 of motor M3 to return. Chamber C12 is connected to chamber C11 by conduit 152. Chamber C11 is connected to return via passageway 164, the bypass passageway in valve V4, conduits 184, 192, open valve V6, conduit 190, open valve V8, and conduit 120. The opening of working chambers C11, C12 to return permits pressure in working chambers C9, C10 of motor M3 to move motor M3 from its rearward position shown in FIG. 6 to its forward position shown in FIG. 3. Working chamber C9 is connected to working chamber C10 by conduit 150. Working chamber C10 is connected to pressure via passageway 162, the valve chamber of valve V5, and conduit 118. When the rear abutment A on motor M3 moves out of contact with the operator of valve V5, the spring biasing of valve V5 closes valve V5. As motor M3 approaches its forward position shown in FIG. 3, the forward abutment A on motor M3 contacts the operator of valve V4 to open valve V4.

The opening of valve V4 by the forward movement of motor M3 causes the switching valve to switch back to the position shown in FIG. 3. The open valve V4 connects the left hand end of switching valve control rod 12 to pressure by connecting pressure conduit 166 to conduits 78, 84 and chamber 82 of valve V1. At the same time, pressure is supplied to the piston of valve V2 via conduits 78, 112. This causes the piston 110 to move to unseat ball 98. The unseating of ball 98 connects piston 104 of valve V1 to return, via return passageway 72, chamber 90, and conduits 92, 106, to allow spring 96 to seat ball 94. It also connects the right hand end of control rod 12 to return via passageway 72 and chamber 90. This allows the control rod 12 to shift to the right from the position shown in FIG. 6 to the position shown in FIG. 3. The shifting of the rod 12 shifts passageway 24 in rod 12 back into communication with return port 56 and passageway 26 back into communication with pressure port 48. The communication of passageway 24 to return allows pressure in port 40 to shift poppet 36 to the left from the position shown in FIG. 6 to the position shown in FIG. 3. The communication of passageway 26 to pressure allows the pressure to act on the piston end of poppet 38 to move popper 38 to the left. The result is the return of all portions of switching valve 10 and relief valves V1, V2 to the configuration shown in FIG. 3. The unload cycle described above is then repeated with the first stage being the movement of all three motors M1, M2, M3 simultaneously to the rear.

The load cycle of the system is essentially the reverse of the above-described unload cycle. In the load cycle, the three motors M1, M2, M3 move simultaneously in the forward direction and sequentially in the rearward direction. As noted above, the function of the valve V3 is to the control the direction in which the system conveys the load. In other words, valve V3 controls whether the system operates in the load or unload cycle. Valve V3 is moved between its unload position shown in FIGS. 3–6 and its load position shown in FIGS. 7–10 at the initiation of the operator of the system. The movement of the valve V3 may be accomplished manually or by any other suitable means, such as by providing valve V3 in the form of a solenoid valve.

Figure 7:
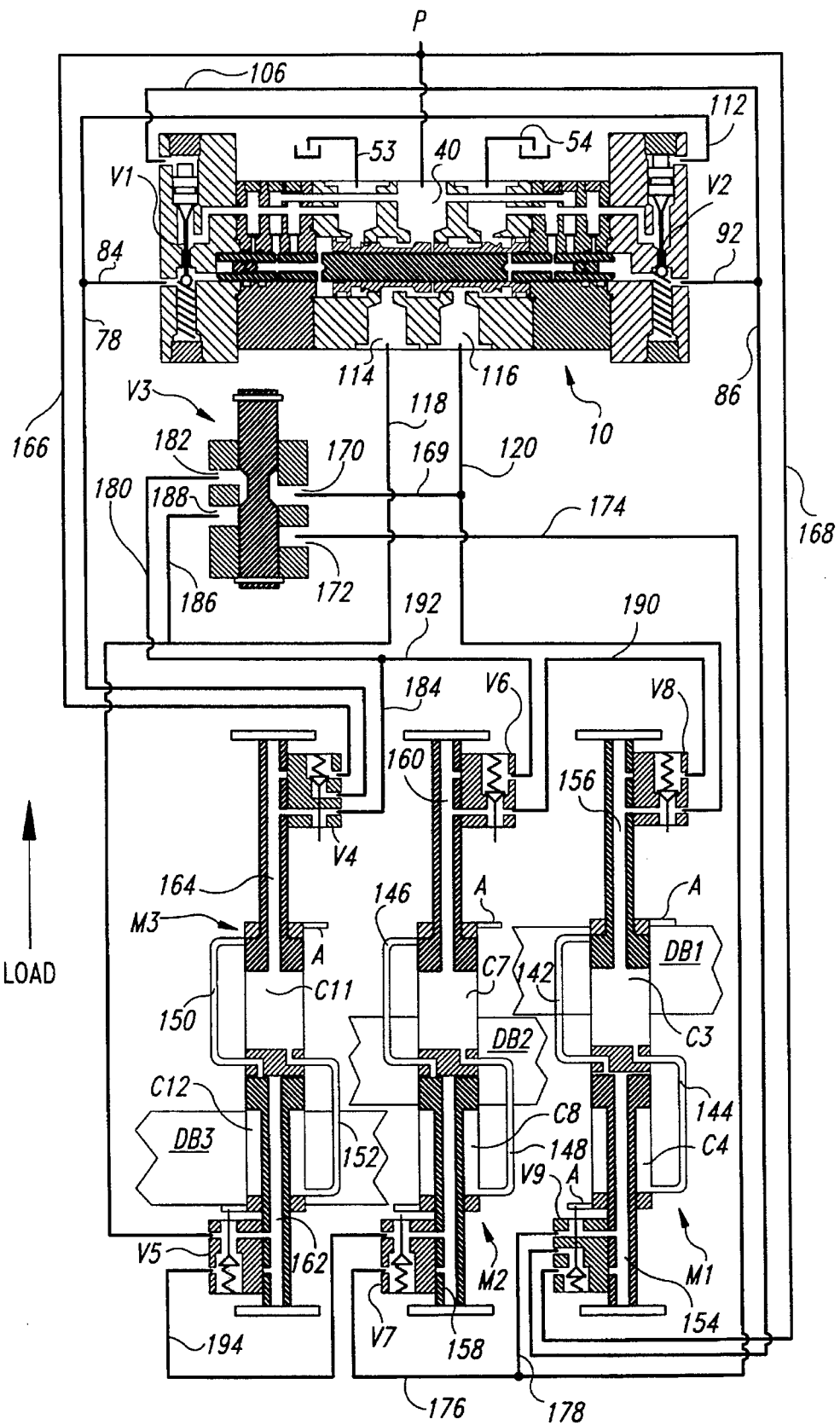
FIG. 7 is a view like FIGS. 3–6, but showing a directional valve shifted to cause a reverse operation of the motors, and showing all three motors positioned in a new start position, and various valves positioned to cause a simultaneous movement of all three motors to a new advanced position.

Referring to FIG. 7, at the start of the load cycle, rear abutments A on motors M1, M2, M3 are in contact with the operators of valves V9, V7, V5 and are holding these valves open. Switching valve 10 connects conduit 118 to pressure. Conduit 120 is connected to return. Pressure in conduit 118 is delivered to working chamber C10 of motor M3 via the valve chamber of valve V5 and passageway 162. The pressure in working chamber C10 is communicated to working chamber C9 through conduit 150. Open valve V5 permits the delivery of pressure through valve V5, conduit 194, the valve chamber of valve V7, and passageway 158 to working chamber C6 of motor M2. Conduit 146 communicates the pressure to working chamber C5. Open valve 7 allows the pressure in conduit 194 to be communicated through valve V7, conduits 176, 178, the bypass passageway in valve V9, and passageway 154 in motor M1 to working chamber C2 of motor M1. Conduit 142 communicates the pressure to working chamber C1.

The connection of working chambers C1, C2, C5, C6, C9, C10 to pressure causes motors M1, M2, M3 to move simultaneously in the load or forward direction indicated by the arrow in FIG. 7. The movement is permitted by connection of working chambers C3, C4, C7, C8, C11, C12 to return. Working chamber C4 of motor M1 is connected via conduit 144, working chamber C3, passageway 156, the valve chamber of valve V8, and conduit 120. Working chamber C12 of motor M3 is connected via conduit 152, working chamber C11, passageway 164, the bypass passageway in valve V4, conduits 184, 180, valve V3, and conduit 120. Conduit 180 also communicates with conduit 192 to connect the spring chamber of valve V6 with return. In motor M2, the pressure in working chambers C5, C6 tending to move motor M2 forwardly creates return pressure in the valve chamber of valve V6 which opens valve V6 an amount sufficient to allow forward movement of the motor M2. The cracking open of valve V6 connects working chamber C8 to return via conduit 148, working chamber C7, passageway 160, valve V6 from its valve chamber to its spring chamber past the unseated valve plug, and conduits 192, 180.

Figure 8:
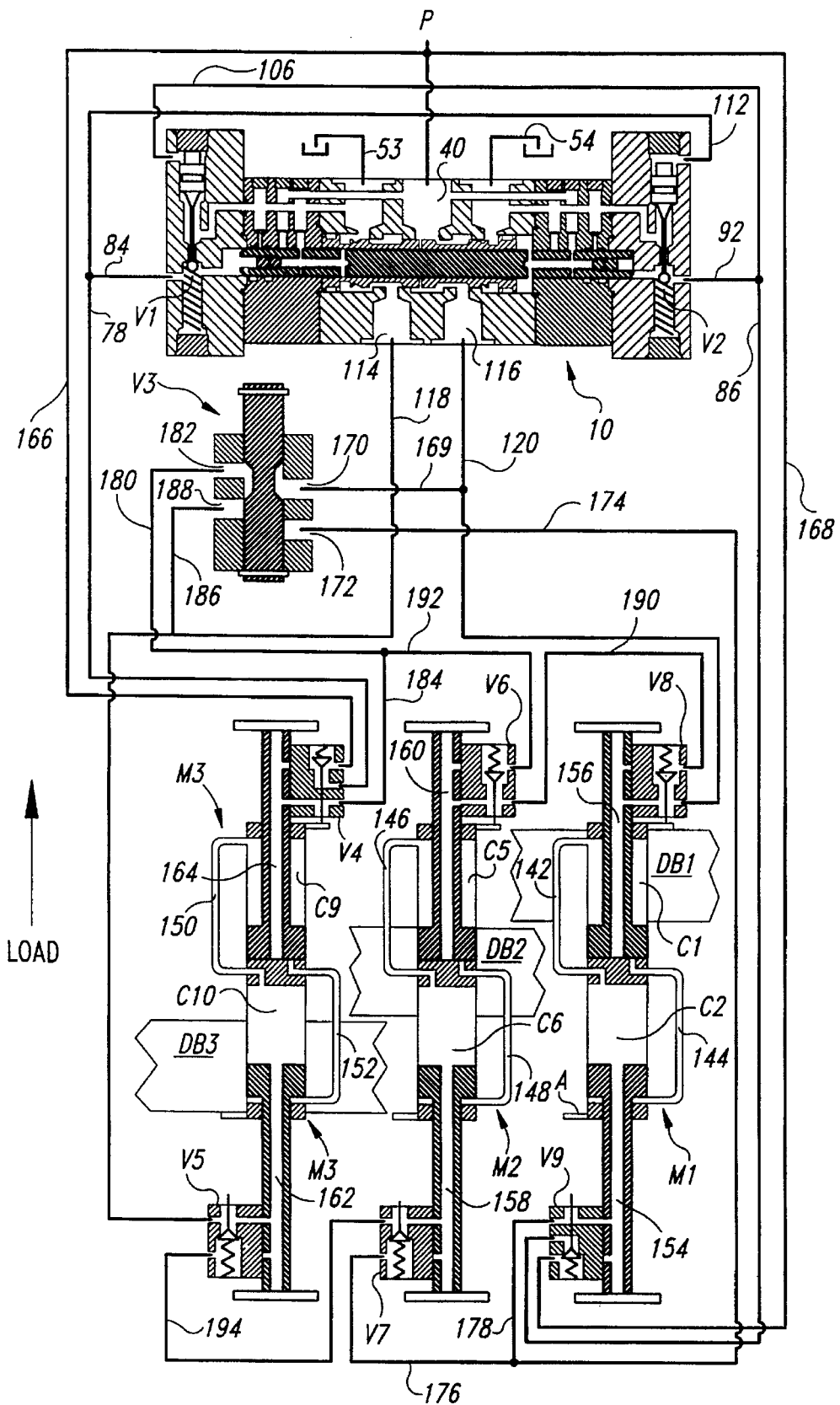
FIG. 8 is a view like FIG. 7, but showing all three motors moved from the start position to the advanced position and showing various valves positioned to trigger the next step of the sequence.

The motors M1, M2, M3 move simultaneously forwardly from the position shown in FIG. 7 to the position shown in FIG. 8. At the beginning of the forward stroke, the rear abutments A on the motors M1, M2, M3 move out of contact with the operators of valves V9, V7, V5. Pressure in the valve chambers of valves V5, V7 continues to hold valves V5, V7 open to continue to supply pressure for the forward movement of motors M1, M2. The forward abutments on motors M1, M2, M3 engage the abutments on valves V8, V6, V4 when the motors M1, M2, M3 approach the end of their forward stroke. The engagement mechanically opens valves V4, V8 and fully opens valve V6.

Referring to FIGS. 7 and 8, the opening of valve V4 connects the left hand end of switching valve control rod 12 to pressure via pressure conduit 166, open valve V4, conduits 78, 84, and chamber 82 of valve V1. It also connects the piston 110 of valve V2 to pressure to cause the piston 110 to move and unseat ball 98. This connects the right hand end of rod 12 and piston 104 of valve V1 to return. The result is that rod 12 shifts to the right (as shown) and poppers 36, 38 shift to the left, as described above. This switches the pressure/return connections to conduits 118, 120. Conduit 118 is switched to return, and conduit 120 is switched to pressure.

Referring to FIG. 8, the change in the configurations of switching valve 10 and valves V1, V2 described above and illustrated in FIGS. 7 and 8 results in the sequential movement of motors M1, M2, M3 in the rearward direction. Motor M3 is the first to move. Pressure for the movement is supplied to motor M3 from conduit 120 via valve 3, conduits 180, 184, the bypass passageway in valve V4, and passageway 164. This applies pressure to working chambers C11, C12 of motor M3. Working chambers C9, C10 are connected to return via passageway 162, the valve chamber of valve V5, and conduit 118. Pressure is also supplied to working chambers C3, C4 of motor M1 via conduit 120 and the valve chamber of valve V8, and to working chambers C7, C8 of motor M2 through the open valve V8, conduit 190, the valve chamber of valve V6, and passageway 160. Rearward movement of motors M1, M2 is blocked by the blocking of the other working chambers of these motors from return until motor M3 nears the end of its stroke.

Figure 9:
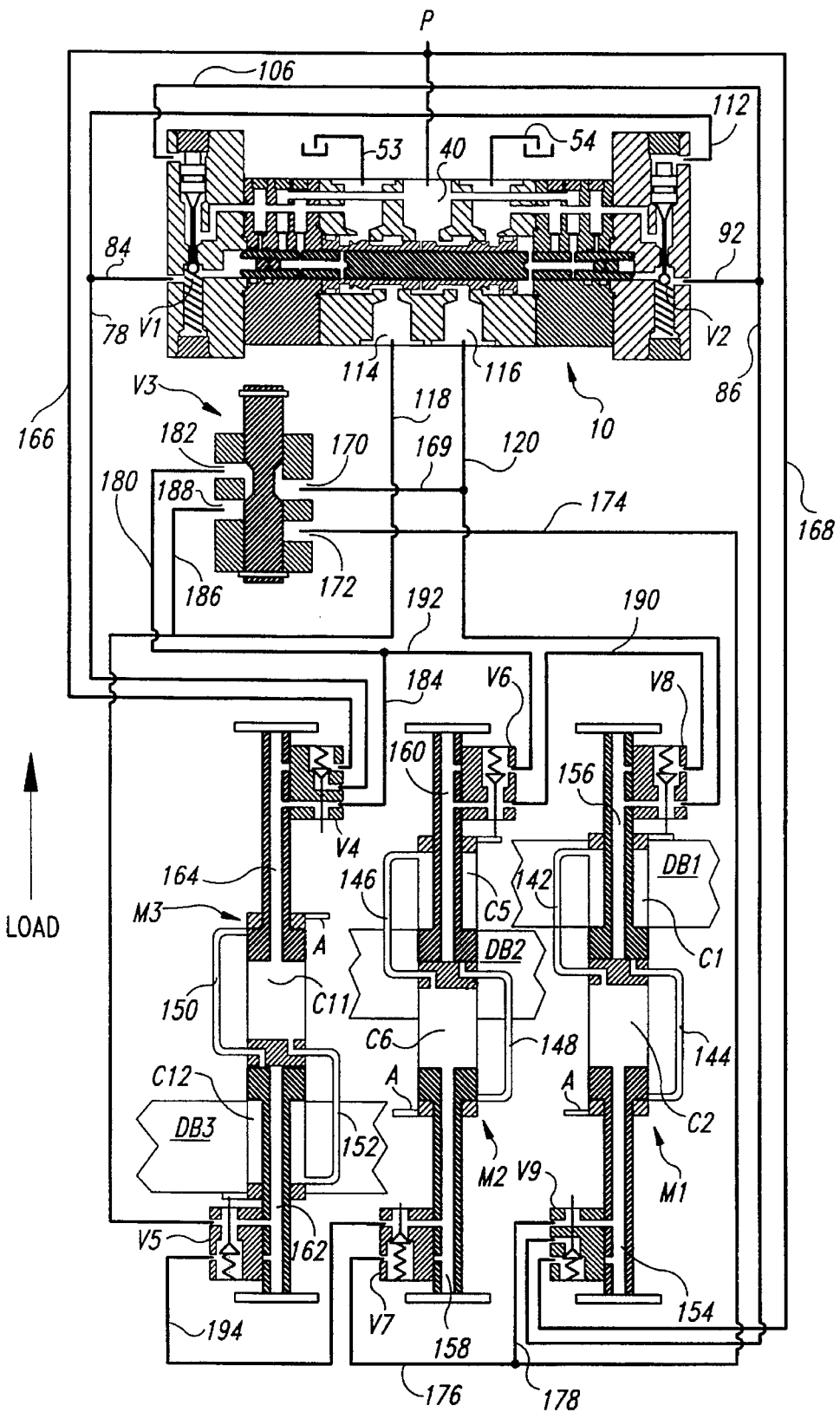
FIG. 9 is a view like FIGS. 7 and 8, but showing one of the motors returned to its start position and the opening of the valve which triggers the next step of the sequence.
Figure 10:
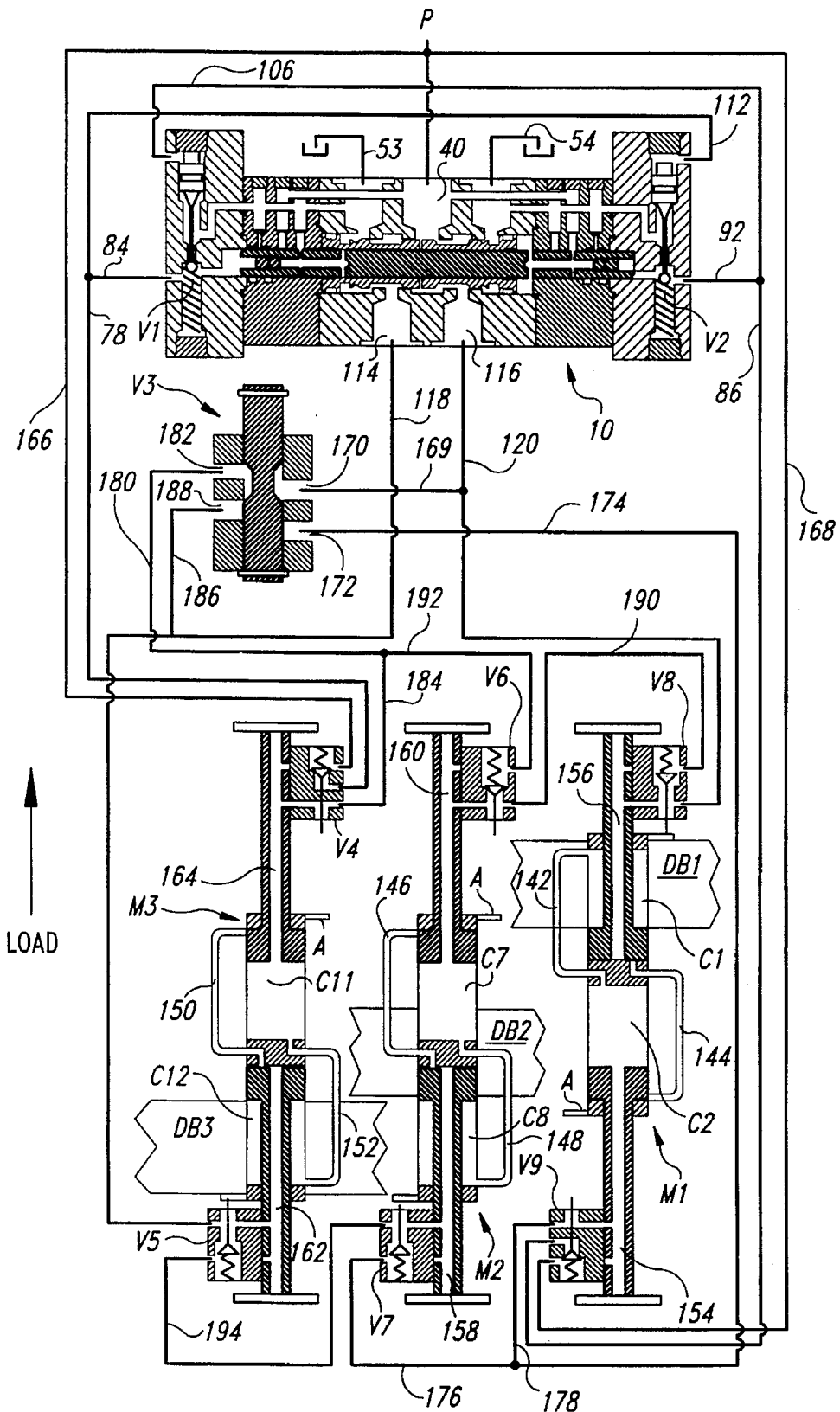
FIG. 10 is a view like FIGS. 7–9, but showing a second of the motors returned to its start position and the opening of a valve which triggers the next step of the sequence.

Referring to FIG. 9, as motor M3 nears the end of its rearward stroke, its rear abutment A engages the operator of valve V5 to open valve V5. The opening of valve V5 connects working chambers C5, C6 of motor M2 with return via passageway 158, the valve chamber of valve V7, conduit 194, open valve V5, and conduit 118. This allows motor M2 to move rearwardly from its position shown in FIG. 9 to its position shown in FIG. 10. Referring to FIG. 10, as motor M2 approaches the end of its stroke its rear abutment A contacts the operator of valve V7 to open valve V7. This opens communication between working chambers C1, C2 of motor M1 and return via passageway 154, the bypass passageway of valve V9, conduits 178, 176, and open valve V7. The resulting rearward movement of motor M1 opens valve V9 to thereby cause the switching valve 10 and valves V1, V2 to return to their configurations shown in FIG. 7, as described above in relation to FIGS. 3 and 4. The load cycle then repeats.

Figure 11:
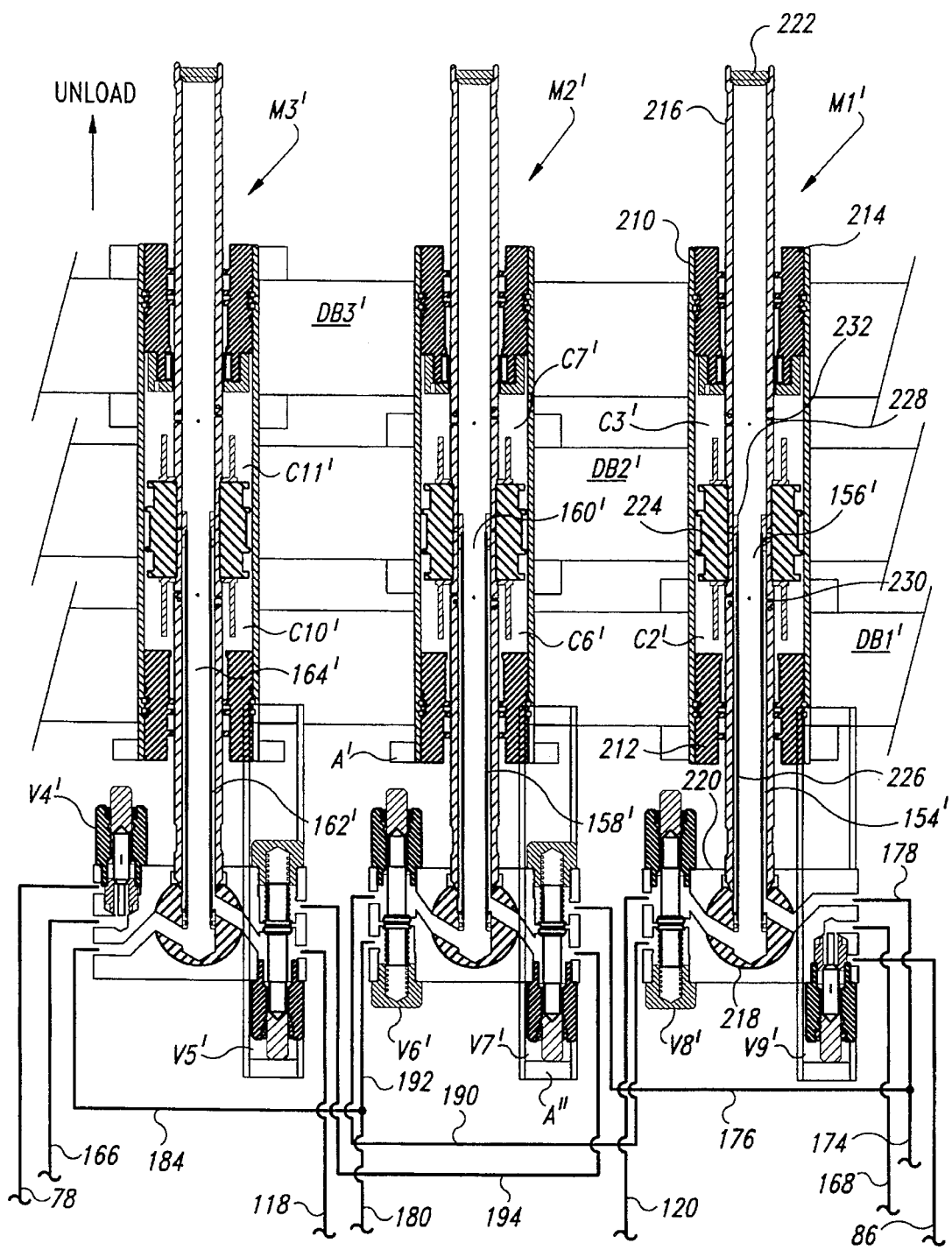
FIG. 11 is a schematic diagram of an alternate form of the three motors and associated valves and conduits, showing each motor in an intermediate position.

FIG. 11 shows three motors M1', M2', M3' that may be used in place of the motors M1, M2, M3 in the system shown in FIGS. 3–10 The three motors M1', M2', M3' are essentially identical. Therefore, the following description of the motor M1' applies also to the other two motors M2', M3'.

The motor M1' comprises a cylinder 210 having opposite cylinder heads 212, 214 with axial openings through which a piston rod 216 is received. A first end of the piston rod 216 has a ball 218 formed thereon which is secured to a fixed support by means of a ball block 220. The ball block 220 may take various forms, such as those disclosed in my U.S. Pat. No. 5,390,781, issued Feb. 21, 1995 and my copending application Ser. No. 08/309,264, filed Sep. 20, 1994. The opposite closed end 222 of the rod 216 may also be secured to a fixed support. A piston head 224 surrounds and is secured to a mid portion of the rod 216. The head 224 sealingly engages the inner circumferential surface of the cylinder 210 to mount the cylinder 210 for axial reciprocation with respect to the piston rod 216.

The piston head 224 separates two annular working chambers C2', C3'. The first working chamber C2' is formed axially between the first cylinder head 212 and the piston head 224. The second working chamber C3' is formed axially between the piston head 224 and the second cylinder head 214. Fluid is introduced into and exhausted from the working chambers C2', C3' through the hollow piston rod 216. The interior of the rod 216 is divided by a tube 226 into an annular passageway 154' and a central passageway 156'. An end seal 228 seals the outer end of the tube 226 to prevent communication between the two rod passageways 154', 156'. One or more ports 230 are formed in the sidewall of the rod 216 to communicate the annular passageway 154' with working chamber C2'. Axially outwardly of the end seal 228, another port or set of ports 232 communicate the center rod passageway 156' with working chamber C3'. Introducing fluid pressure into working chamber C3' and connecting working chamber C2' to return moves the cylinder 210 in the unload direction, indicated by the arrow in FIG. 11. Introduction of pressure into working chamber C2' and connecting chamber C3' to return causes movement of the cylinder 210 in the opposite direction.

Each of the three motors M1', M2', M3' has attached thereto a transverse drive beam DB1', DB2', DB3', respectively. Each of the drive beams DB1', DB2', DB3' is connected to the cylinder 210 of its respective motor and the floor slats in the corresponding set of floor slats.

The operation of the motors M1', M2', M3' is substantially the same as the operation of the motors M1, M2, M3 shown in FIGS. 3–10. The operation is controlled by check valves V4', V5', V6', V7', V8', V9' that are associated with the motors M1', M2', M3' and function in the manner of the valves V4, V5, V6, V7, V8, V9 shown in FIGS. 3–10. The valves V4'–V9' and motors M1', M2', M3' are connected to pressure and return through conduits corresponding to the conduits shown in FIGS. 3–10 and having the same reference numerals in FIG. 11. Portions of the motors M1', M2', M3' corresponding to portions of the motors M1, M2, M3 shown in FIGS. 3–10 are indicated in FIG. 11 by the same reference numeral with a prime designation added thereto. The cylinder 210 of each motor M1', M2', M3' carries a pair of abutments A', A" for mechanically opening the valves V4'–V9'. Since both valves associated with a particular motor are located on the same end of the motor, the second abutment A" is axially spaced from the cylinder 210 which carries it. The abutment A" engages the far end of the valve to open the valve. The valves communicate the motor working chambers to pressure and return through passageways in the ball blocks 220 and corresponding passageways in the piston rod ball ends 218. These passageways in turn communicate with the piston rod passageways, passageways 154', 156' in the case of motor M1'. As in FIGS. 3–10, the motors M1', M2', M3' shown in FIG. 11 are incorporated into a system that also includes a switching valve 10 and a direction control valve V3 (not shown in FIG. 11).

Figure 12:
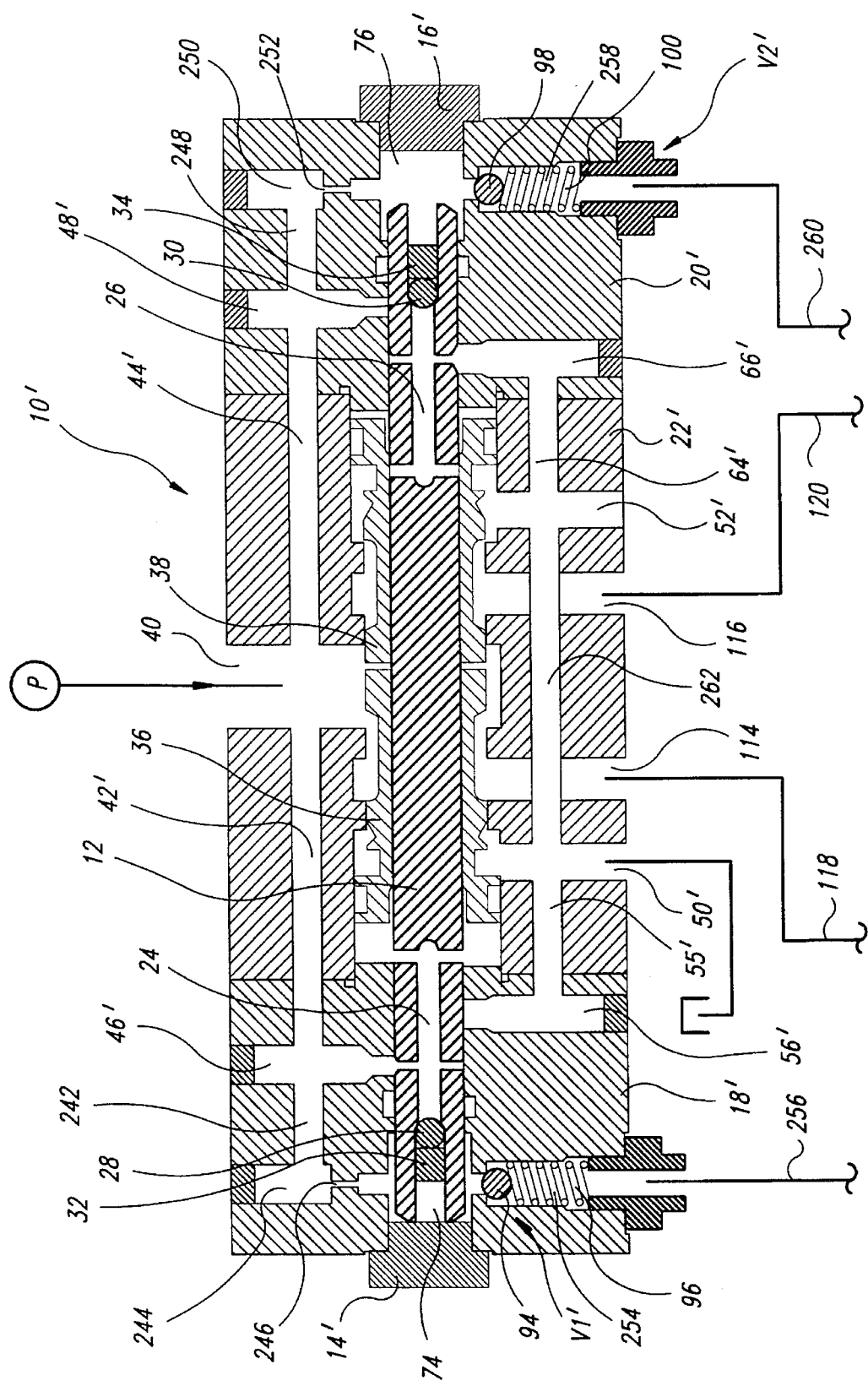
FIG. 12 is a view like FIG. 1 but showing another embodiment of the switching valve.

FIG. 12 is a longitudinal sectional view of another embodiment of the switching valve of the invention. In FIG. 12, elements of the switching valve 10' that are the same as the elements of the valve 10 shown in FIG. 1 have the same reference numerals as in FIG. 1. Elements that correspond but are modified have the same reference numeral with the addition of a prime designation. Elements that are part of noncorresponding structure have unique reference numerals.

Referring to FIG. 12, the switching valve 10' has a three-part housing including opposite housing end parts 18', 20' and a housing center part 22' positioned therebetween. The ends of a longitudinal cavity extending through the housing parts 18', 20', 22' are closed by housing end plugs 14', 16'. The valve control rod 12 is received in the cavity. Poppets 36, 38 are positioned on and supported by the control rod 12. As in the valve 10 shown in FIG. 1, longitudinal movement of the control rod 12 causes shifting of the poppets 36, 38 to alternately connect outlet ports 114, 116 to pressure and return. The return ports 50', 52' to which the outlet ports 114, 116 are connected to connect ports 114, 116 to return are modified in that, rather than being separate ports, port 52' is an internal port connected to port 50' by a passageway 262. This modification has no effect on the functioning of the valve.

The major differences between the valve 10' shown in FIG. 12 and the valve 10 shown in FIG. 1 are in the structure of the pressure passageways and the relief valves associated with the pilot chambers 74, 76 of the control rod 12. Branch pressure passageways 242, 248 extend from pressure distribution ports 46', 48', respectively. The branch passageways 242, 248 connect ports 46', 48' with additional pressure distribution ports 244, 250. A restriction 246, 252 is formed in each of the ports 244, 250. The ports 244, 250 open onto the pilot chambers 74, 76, thereby continuously connecting the pilot chambers 74, 76 to pressure. The restrictions 246, 252 prevent unwanted shifting of the control rod 12 in response to leakage in the system.

As stated above, each pilot chamber 74, 76 is continuously connected to pressure. Relief of pressure in the pilot chamber 74, 76 is normally blocked by a relief valve V1', V2'. The valve V1' associated with pilot chamber 74 has a closure ball 94 and biasing spring 96 in a valve chamber 254. The spring 96 normally biases the ball 94 to close an orifice separating the valve chamber 254 from the pilot chamber 74. A conduit 256 is in open communication with the valve chamber 254. The valve V2' associated with pilot chamber 76 has the same structure. A closure ball 98 located in a valve chamber 258 is biased by a spring 100 to close an orifice separating the valve chamber 258 and the pilot chamber 76. A conduit 260 is in open communication with the valve chamber 258.

In the operation of the valve 10', connection of the conduit 260 to return allows the control rod 12 to shift from the position shown in FIG. 12 to the right (as shown). The shifting of the control rod 12 causes the poppets 36, 38 to move, as described above. The connection of conduit 260 to return allows pressure in pilot chamber 76 to unseat closure ball 98 and thereby connect pilot chamber 76 to return. When the pilot chamber 76 is connected to return, pressure moves out from pilot chamber 76 through valve V2' faster than it can move into pilot chamber 76 through restriction 252 to create the pressure differential that allows the control rod 12 to shift. Shifting of the control rod in the other direction (to the left as shown) is accomplished by connecting the conduit 256 to return to allow pressure in pilot chamber 74 to unseat closure ball 94 and thereby connect pilot chamber 74 to return.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. In a switching valve of a type having a two position control rod with a pilot chamber at each of its ends, the improvement comprising:

for each said pilot chamber:

a first passageway connected to a pressure line and communicating with said pilot chamber;

a second passageway connectable to return and having one end defined by an orifice;

a valve seat surrounding said orifice; and a relief valve having a valve member biased into a closed position in which it is seated against said valve seat to close said orifice to close communication between said pilot chamber and said second passageway; said valve member having an open position in which said valve member is moved away from said orifice to connect said pilot chamber to return via said second passageway to allow shifting of the control rod;

said first passageway being in open communication with said pilot chamber when said valve member is in said closed position or said open position.

2. In a switching valve of a type having a two position control rod with a pilot chamber at each of its ends, the improvement comprising:

for each said pilot chamber:

a first passageway connected to a pressure line and communicating with said pilot chamber;

a second passageway connectable to return; and a relief valve having a valve member biased to close an orifice to close communication between said pilot chamber and said second passageway; said valve member having an open position in which said pilot chamber is connected to return via said second passageway to allow shifting of the control rod;

in which, in use, said pilot chamber is continuously in communication with pressure via said first passageway, and said valve member is moved into its open position by said pressure in response to connection of said second passageway to return.

3. The improvement of claim 2, comprising a restriction in said first passageway to allow pressure to move out from said pilot chamber through said orifice faster than pressure can move into said pilot chamber through said first passageway.

4. In a switching valve of a type having a two position control rod with a pilot chamber at each of its ends, the improvement comprising:

for each said pilot chamber:

a first passageway connected to a pressure line and communicating with said pilot chamber;

a second passageway connectable to return; and a relief valve having a valve member biased to close an orifice to close communication between said pilot chamber and said second passageway; said valve member having an open position in which said pilot chamber is connected to return via said second passageway to allow shifting of the control rod;

which comprises an operator positioned to engage said valve member; and in which said second passageway is, in use, continuously in communication with return, and said valve member is mechanically moved into its open position by said operator in response to pressure acting on said operator.

5. In a switching valve of a type having a two position control rod with a pilot chamber at each of its ends, the improvement comprising:

for each said pilot chamber:

a first passageway connectable to pressure and communicating with said pilot chamber;

a second passageway connected to return;

a relief valve including a valve member biased to close an orifice to close communication between said second passageway and said pilot chamber, and an operator having a first end positioned to engage said valve member and a second end with a piston formed thereon; and a conduit communicating said first passageway for said pilot chamber with said piston of said relief valve for the other said pilot chamber;

wherein pressure in said first passageway for one of said pilot chambers is communicated to said one of said pilot chambers and to said piston of said relief valve for the other of said pilot chambers to move said piston and mechanically unseat said valve member to connect said other of said pilot chambers to return and allow pressure in said one of said pilot chambers to shift the control rod.

6. In combination:

the improvement of claim 5; and a plurality of drive motors, each said motor having a movable portion that carries an abutment; and first and second check valves, one for each said first passageway; each said check valve having a valve member biased into a closed position in which it blocks the corresponding first passageway, and an operator positioned to be engaged by one of said abutments to mechanically unseat said valve member of said check valve and connect the corresponding first passageway to pressure.

7. The combination of claim 6, in which, in use, each said check valve is continuously connected to pressure that acts on said valve member of said check valve to bias said valve member of said check valve into said closed position.

8. In combination:

the improvement of claim 5; and a plurality of drive motors, each said motor having a movable portion that carries an abutment; and first and second check valves, one for each said first passageway; each said check valve having a valve member biased into a closed position in which it blocks the corresponding first passageway, and an operator positioned to be engaged by one of said abutments to mechanically unseat said valve member of said check valve and connect the corresponding first passageway to pressure;

wherein said switching valve operates to switch pressure and return between first and second supply conduits leading to said motors to cause said movable portions to reciprocate.

9. The combination of claim 8, in which, in use, each said check valve is continuously connected to pressure that acts on said valve member of said check valve to bias said valve member of said check valve into said closed position.

10. In a switching valve of a type having a return port and a two position control rod with a pilot chamber at each of its ends, the improvement comprising:

a relief valve for each said pilot chamber; each said relief valve having a valve cavity divided by an orifice into first and second valve chambers communicating with said pilot chamber and the return port, respectively, a valve member in said first valve chamber biased to close said orifice, a piston slidably received in said valve cavity spaced from said orifice to partially define said second valve chamber, and an operator stem extending from a first end of said piston into said second valve chamber and said orifice to engage and unseat said valve member in response to movement of said piston toward said orifice; and a conduit communicating said first valve chamber of each said relief valve with a second opposite end of said piston of the other said relief valve;

wherein pressure communicated to one of said pilot chambers via said first valve chamber of the respective relief valve is also communicated to said second end of said piston of the other relief valve to unseat said valve member of said other relief valve and thereby connect the other pilot chamber to return and allow the pressure in said one of said pilot chambers to move the control rod.

11. In combination:

the improvement of claim 10; and a pressure line for each said first valve chamber connecting said first valve chamber to pressure; and a plurality of drive motors, each said motor having a movable portion carries an abutment; and first and second check valves, one for each said pressure line; each said check valve having a valve member biased into a closed position in which it blocks said pressure line, and an operator positioned to be engaged by one of said abutments to mechanically unseat said valve member of said check valve and connect the corresponding first valve chamber to pressure.

12. The combination of claim 11, in which, in use, each said check valve is continuously connected to pressure that acts on said valve member of said check valve to bias said valve member of said check valve into said closed position.

13. In combination:

the improvement of claim 10; and a pressure line for each said first valve chamber connecting said first valve chamber to pressure; and a plurality of drive motors, each said motor having a movable portion that carries an abutment; and first and second check valves, one for each said pressure line; each said check valve having a valve member biased into a closed position in which it blocks said pressure line, and an operator positioned to be engaged by one of said abutments to mechanically unseat said valve member of said check valve and connect the corresponding first valve chamber to pressure;

wherein said switching valve operates to switch pressure and return between first and second supply conduits leading to said motors to cause said movable portions to reciprocate.

14. The combination of claim 13, in which, in use, each said check valve is continuously connected to pressure that acts on said valve member of said check valve to bias said valve member of said check valve into said closed position.

15. In a control system for a reciprocating floor conveyor of a type having a plurality of floor slats and a plurality of fluid pressure operated drive motors for reciprocating the floor slats, the combination comprising:

first and second conduits; each said conduit having a main portion leading to said motors, and a branch portion;

a switching valve for alternately connecting said conduits to pressure and return to reciprocate the floor slats; and a four-way valve having first and second ports communicating with said branch portions of said first and second conduits, respectively, and third and fourth ports communicating with opposite ends of said motors; said four-way valve having a first position in which it connects said first port with said third port and blocks communication between said second port and said fourth port to cause the conveyor to convey a load in a first direction, and a second position in which it blocks communication between said first and third ports and connects said second and fourth ports to cause the conveyor to convey a load in a second opposite direction.

* * * * *

UNITED STATES PATENT AND TRADEMARK OFFICE
CERTIFICATE OF CORRECTION

PATENT NO: 5,622,095

DATED: April 22, 1997

INVENTOR(S): Raymond K. Foster

It is certified that error appears in the above-identified patent and that said Letters Patent are hereby corrected as shown below:

Column 5, line 34, "Popper" should be -- Poppet --.

Column 7, line 64, "Port 170" should be -- Port 172 --.

Column 10, line 5, "poppers" should be -- poppets --.

Column 11, line 35, "popper" should be -- poppet --.

Column 12, line 45, "poppers" should be -- poppets --.

Column 17, sixth line of claim 11, after "movable portion", insert -- that --.

Signed and Sealed this

Twenty-first Day of October 1997

Attest:

BRUCE LEHMAN

*Attesting Officer*  *Commissioner of Patents and Trademarks*